J. G. EPLEY.
SADDLE SUPPORT FOR MOTOR CYCLES, &c.
APPLICATION FILED NOV. 22, 1913.

1,120,379.

Patented Dec. 8, 1914.

WITNESSES.

INVENTOR.
James G. Epley

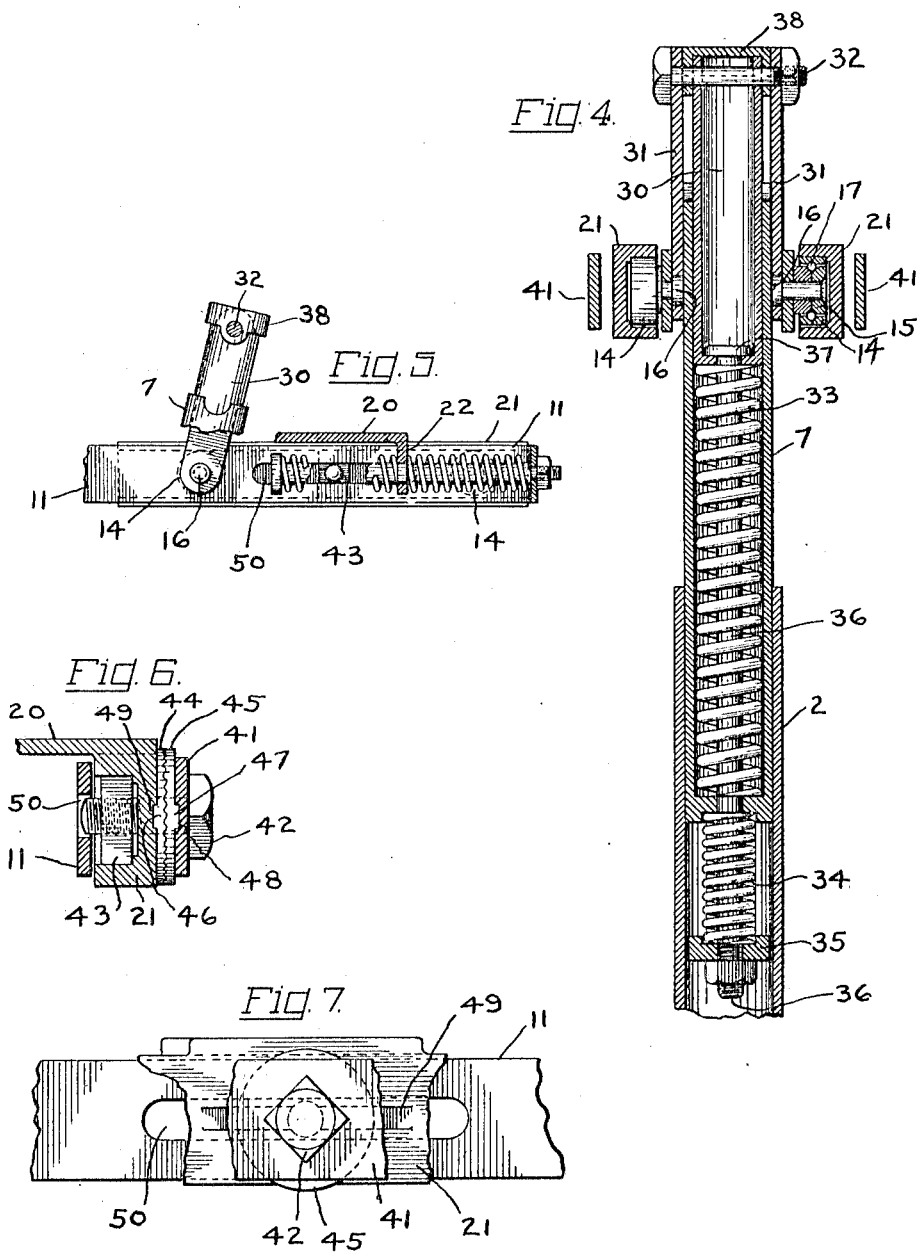

UNITED STATES PATENT OFFICE.

JAMES G. EPLEY, OF LEIPSIC, OHIO, ASSIGNOR OF ONE-HALF TO HARRY F. WENDELL, OF LEIPSIC, OHIO.

SADDLE-SUPPORT FOR MOTOR-CYCLES, &c.

1,120,379.      Specification of Letters Patent.      Patented Dec. 8, 1914.

Application filed November 22, 1913. Serial No. 802,412.

*To all whom it may concern:*

Be it known that I, JAMES G. EPLEY, a citizen of the United States, and a resident of Leipsic, in the county of Putnam and State of Ohio, have invented a certain new and useful Saddle-Support for Motor-Cycles, &c.; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to means for cushioning objects which ordinarily are subject to shocks or jars.

It more particularly relates to means for cushioning saddles used in connection with vehicles and conveyances, such as motor-cycles.

It has for its object to produce a cushioning means which permits considerable yielding movements in all directions in which shocks or jars occur when the saddle or object is in use.

The invention may be embodied in many varied forms of construction. I have selected a construction as an example of a large number of devices containing the invention and I shall describe hereinafter and show how such construction may be made and operated. The particular construction selected is shown in the accompanying drawings.

Figure 1 is a side view, partly in section, of a cushion saddle. Fig. 2 illustrates guiding rollers in movable channel race ways. Fig. 3 is a top view of the saddle support. Fig. 4 is a sectional view of the adjustable saddle post and the vertical cushioning means. Fig. 5 shows a longitudinal section of the transverse cushioning means. Fig. 6 shows the means employed for locking the saddle frame to the cushion frame, and Fig. 7 is a side view of the means shown in Fig. 6, some of the parts being shown broken away for clearness of illustration.

Referring to the drawings, 1, Fig. 1, is a motorcycle or bicycle frame comprising the stanchion 2, the bracing member 3, and the horizontal tie member 4. The hollow stanchion 2 is provided with a slot 5 and ears 6. It is adapted to receive the saddle post 7 which is secured in adjustable relation by means of the bolt 8 located in the ears 6 which narrows the slot 5 and securely binds and holds the post 7 in position. The post 7 is provided with a horn 9, which extends forward and in the central plane of the motorcycle.

The post 7 supports the saddle and the shock absorber. Intermediate the saddle and the post a cushioning means is located, which cushions all shocks or jars produced. They are all resolvable into horizontal and vertical components and are yieldingly resisted by compression springs acting in line with the components and in opposition thereto.

The cushion frame has a slotted or U-shaped member 11 having bifurcations. The furcations 12 are secured to the horn 9 by means of a bolt 13. Rollers 14 are secured to the U-shaped member 11. The rollers 14 may be of the ordinary type or may have ball bearings. I have shown an arrangement of the latter type. Each roller has a hub 15 and an interior race-way in which the balls 17 are located. The roller of either type 14 is secured to the U-shaped member 11 by means of bolts 16. Two pairs of rollers are provided. They are located at each end of the U-shaped or slotted member 11. A frame 20 is slidably connected to the U-shaped member 11. It rolls on the rollers 14. It has two channels 21, which set over the ends of the rollers. It rolls on the upper web of the channel normally and on the lower web of the channel temporarily when there is a shock.

The frame 20 is provided with a depending apertured ear 22. A bolt 23 extends through the apertured ear 22 and is secured in position in the U-shaped member 11 by means of the nut 24. A spring 25 is located between the apertured ear 22 and the head of the bolt 23, and a spring 27 is located between the apertured ear and the frame 11. The springs 25 and 27 cushion the movement of the frame 20 when it is moved in either direction with respect to the slotted or U-shaped member 11.

The post 7 is a telescoping post having the telescoping member 30 to which the slotted or U-shaped member 11 is connected. The member 30 is yieldingly supported in the post 7. Links 31 connect the U-shaped or slotted member 11 to the top of the post 110

30 which thus support the U-shaped member and the slidable frame 20. The links are pivotally secured by means of bolts 32 and 16 to allow arcuate movements of the member 11 about the end of the horn 9. A spring 33 yieldingly supports the post 30. It is located between the lower end of the post 30 and the lower end of the saddle post 7. A spring 34 is also located between the lower end of the saddle post 7 and the washer 35 located upon the bolt 36, which cushions the return of the saddle when there is a shock or jar. The bolt 36 is provided with a head 37 located in the post 30. The bolt 36 holds the springs and the parts of the telescoping saddle post in definite relations.

The saddle 40 is supported by means of two depending strips forming a supporting saddle frame 41, which are bolted to the frame 20 by means of the bolts 42 having nuts 43. The angular relation of the saddle with respect to the frame 20 is fixed by the washers 44 and 45 having radial facial teeth which intermesh and engage with each other, and also having ridges 46 and 47 which set into channels 48 and 49 located respectively in the saddle frame 41 and the supporting frame 20. The saddle may be turned to any angular position desired and locked in position by means of the facial channels and ridges of the engaging members. A slot 50 is formed in the U-shaped frame 11 and allows free movement of the end of the bolt 42 with respect to the frame 11. The bolt 42 may extend through the slot. By this arrangement the component parts of a jar or shock may be yieldingly sustained by the springs 25 and 27 and 33 and 34. The cushioning means thus gives yielding movements in all directions in a vertical plane passing through the central longitudinal line of the saddle.

Having thus described my invention, what I claim as new, and desire to secure by Letters Patent, is:—

1. The combination of a saddle and a saddle post, a frame connected to the saddle, a second frame pivotally connected to the saddle post and slidably connected to the first named frame, a plunger movable in the saddle post and connected to the second named frame, springs for yieldingly supporting the first named frame with respect to the second named frame, and a spring for yieldingly supporting the plunger with respect to the saddle post.

2. The combination of a saddle and a saddle post, a frame connected to the saddle, a second frame pivotally connected to the saddle post and slidably connected to the first named frame, and means for pivotally connecting the second named frame with the saddle post.

3. The combination of a saddle and a saddle post, a frame connected to the saddle, a second frame pivotally connected to the saddle post and slidably connected to the first named frame, and links pivotally connecting the second named frame with the saddle post.

4. The combination of a saddle and a saddle post, a frame connected to the saddle, a second frame pivotally connected to the saddle post and slidably connected to the first named frame, a plunger yieldingly supported in the saddle post, and links for pivotally connecting the second named frame with the plunger.

5. The combination of a saddle and a saddle post, a frame connected to the saddle, a second frame pivotally connected to the saddle post and slidably connected to the first named frame, and a plunger yieldingly supported in the saddle post and pivotally connected to the second named frame.

6. The combination of a saddle and a saddle post, a frame connected to the saddle, a second frame pivotally connected to the saddle post and slidably connected to the first named frame, a plunger yieldingly supported in the saddle post and pivotally connected to the second named frame, and means for yieldingly maintaining the frames in normal positions relative to each other.

7. The combination of a saddle and a saddle post, a frame connected to the saddle, a second frame pivotally connected to the saddle post and slidably connected to the first named frame, a plunger yieldingly supported in the saddle post, links for connecting the plunger with the second named frame, and means for yieldingly maintaining the frames in normal position with respect to each other.

8. The combination of a saddle, an adjustable telescoping saddle post, a frame connected to the saddle, a second frame pivotally connected to the adjustable saddle post and slidably connected to the first named frame, a plunger yieldingly supported in the adjustable saddle post, links for pivotally connecting the second named frame with the upper end of the plunger, and yielding means for maintaining the frames in their normal position relative to each other.

9. The combination of a saddle and a saddle post, a frame connected to the saddle, a horn secured to the saddle post and extending forward in front of the saddle post, a second frame pivotally connected to the end of the horn and slidably connected to the first named frame, a plunger yieldingly supported in the saddle post, links pivotally connected to the upper end of the plunger and to the second named frame, and means for yieldingly maintaining the frames in their normal position relative to each other.

10. The combination of a saddle and a saddle post, a frame having channels, a second frame pivotally secured to the said saddle post and having roller bearings located in the channels and adapted to support the first named frame, means for elastically supporting the said frames with respect to each other and the saddle post.

In testimony whereof, I have hereunto signed my name to this specification in the presence of two subscribing witnesses.

JAMES G. EPLEY.

Witnesses:
F. E. AUL,
S. T. KLOTZ.

Copies of this patent may be obtained for five cents each, by addressing the "Commissioner of Patents, Washington, D. C."